United States Patent [19]
Kawazoe

[11] Patent Number: 5,303,099
[45] Date of Patent: Apr. 12, 1994

[54] HARD DISK DRIVER INCLUDING A FLYING HEAD SLIDER

[75] Inventor: Kazushige Kawazoe, Kanagawa, Japan

[73] Assignee: Sony Corporation, Tokyo, Japan

[21] Appl. No.: 26,212

[22] Filed: Mar. 2, 1993

Related U.S. Application Data

[63] Continuation of Ser. No. 717,524, Jun. 19, 1991, abandoned.

[30] Foreign Application Priority Data

Jun. 25, 1990 [JP] Japan ................... 2-165974

[51] Int. Cl.$^5$ ................... G11B 5/60; G11B 11/12; G11B 5/012
[52] U.S. Cl. ................... 360/103; 360/114; 360/75
[58] Field of Search ............ 369/13; 360/114, 59, 360/103, 66, 73.8, 75

[56] References Cited

U.S. PATENT DOCUMENTS

| | | | |
|---|---|---|---|
| 4,777,544 | 10/1988 | Brown et al. | 360/103 |
| 4,819,091 | 4/1989 | Brezoczky et al. | 360/103 |
| 4,931,887 | 6/1990 | Hegde et al. | 360/103 |
| 5,020,041 | 5/1991 | Nakao et al. | 369/13 |
| 5,068,841 | 11/1991 | Nakayama et al. | 369/13 |
| 5,077,713 | 12/1991 | Takizawa et al. | 360/114 |
| 5,202,863 | 4/1993 | Miyatake et al. | 369/13 |

FOREIGN PATENT DOCUMENTS

| | | | |
|---|---|---|---|
| 0256356A2 | 2/1988 | European Pat. Off. | G11B 5/60 |
| 0326683A2 | 8/1989 | European Pat. Off. | G11B 5/60 |
| 0284913A2 | 10/1988 | Fed. Rep. of Germany | G11B 5/60 |

*Primary Examiner*—Hoa T. Nguyen
*Attorney, Agent, or Firm*—Philip M. Shaw, Jr.

[57] ABSTRACT

A flying head slider of a hard disk driver is moved by an actuator between a loading and an unloading position, a motor for rotating a disk is driven at nominal velocity when data is recorded on the disk by a magnetic head supported by the flying head slider and the motor is driven at a velocity faster than the nominal velocity when the flying head slider is moved from the loading position to the unloading position or from the unloading position to the loading position.

4 Claims, 3 Drawing Sheets

HARD DISK DRIVER INCLUDING A FLYING HEAD SLIDER

This is a continuation of co-pending application Ser. No. 07/717,524 filed on Jun. 19, 1991, now abandoned.

BACKGROUND OF THE INVENTION

1. Field of the Invention

The present invention relates generally to a hard disk driver apparatus, and more specifically to a hard disk driver apparatus including a flying head slider which is movable between a loading position and an unloading position facilitated by air flow generated from rotation of a record medium.

2. Description of the Background Art

As is well known in the art, a hard disk driver apparatus employs a flying head slider loading system of a contact start/stop type. In this apparatus, a magnetic head-mounted on a flying head slider is in contact with a surface of a disk when the disk is stopped, while being kept away from the disk when the disk is started to rotate due to air flow generated by rotation of the disk. Although the conventional hard disk driver apparatus of this type has a simple structure, there is a disadvantage in that the disk and the slider are eventually damaged due to contact of the disk with the slider upon loading and/or unloading. In addition, it is necessary to provide a slider landing zone on the disk, which serves for loading and unloading of the slider. The zone should be a non-record track on which no data is present.

In order to eliminate such disadvantages, another apparatus of a non-contact slider loading type is disclosed in Japanese Utility Model laid-open publication No. 61-145380. A flying head slider of the disclosed apparatus is placed in its unloading position where the slider is spaced apart from the disk, when the disk is stopped. On the other hand, when the disk begins to rotate, the slider is lowered to reach its loading position where the slider is close to the disk. In such an apparatus, the slider usually does not contact the disk so that both the slider and the disk are subject to less damage in comparison with the contact start/stop type.

Recently, electromagnetic waves having a shorter wave length than previously utilized have been used for increasing the storage capacity of the disk. For this purpose, the distance between the slider and the disk in the loading position is smaller. However, since the slider is supported by a gimbal arm which is elastically deformable, the slider vibrates upon moving from the unloading position to the loading position. In the worst case, it is likely that the slider may undesirably contact the disk, resulting in damage to either the slider or the disk.

SUMMARY OF THE INVENTION

Accordingly, it is an object of the present invention to provide a hard disk driver apparatus which can effectively prevent inconvenient contact between a flying head slider and a disk upon unloading of the slider.

It is another object of the present invention to provide a hard disk driver apparatus which can eliminate damage caused by contact between a flying head slider and a disk upon unloading of the slider.

In accordance with the present invention, there is provided a hard disk drive apparatus comprising (a) a power supply, including a power switch which can be turned on and off, for selectively supplying power, (b) motor means, including a speed controllable motor, for rotating a recording medium either at a first, nominal speed or a second speed higher than the nominal speed, (c) a flying head slider for supporting a transducer head relative to a recording surface on the recording medium as a result of an air bearing effect created by an air flow generated by rotation of the recording medium, (d) support means which can be controlled to support the flying head slider at an unloading position where the flying head slider is prevented from contacting the recording surface, and (e) control means connected to the power switch, the motor means, and the support means for detecting that the power switch has been turned off and thereafter controlling the motor to increase the rotational speed of the recording medium form the first, nominal speed to the second, higher speed thereby increasing the air flow and causing the flying head slider to lift the transducer head further away from the recording surface, and for thereafter controlling the support means to support the flying head slider from the unloading position.

In the preferred embodiment, the control means further controls the motor to rotate the recording medium at the second, higher speed after detecting that the power switch has been turned on, controls the support means to cease supporting the flying head slider from the unloading position at the expiration of a first predetermined time period form when the power switch has been turned on, and controls the motor to rotate the recording medium at the first, nominal speed at the expiration of a second predetermined time period form when the power switch has been turned on, to cause the flying head slider to gradually move from the unloading position to a loading position immediately above the recording surface as the rotational speed of the recording medium deceases from the second speed to the first, nominal speed after the expiration of the second predetermined time period.

The invention also includes a method of raising a transducer had of a hard disk drive away from a recording surface of a rotating recording medium when the hard disk drive is depowered, comprising the steps of (a) flying a head slider for supporting the transducer head relative to the recording surface on an air bearing created by rotation of the recording medium at a first, nominal speed, (b) turning off a power supply for supplying power to the hard disk drive, and (c) thereafter increasing the rotation of the recording medium from the first, nominal speed to a second speed, higher than the nominal speed, thereby increasing a lifting force exerted by air bearing on the flying head slider and causing the flying head slider to lift the transducer head further away from the recording surface, and (d) thereafter stably supporting the flying head slider at an unloading position where the flying head slider is prevented form contacting the recording surface after the recording medium stops rotating.

The preferred embodiment of the method includes the further steps of turning on the power supply and then rotating the recording medium at the second speed, releasing the flying head slider form the unloading position at the expiration of a first predetermined time period from when the power supply has been turned on, and rotating the recording medium at the first, nominal speed at the expiration of a second predetermined time period from when the power supply has been turned on, to cause the flying head slider to gradually move from the unloading position to a loading position immediately above the recording surface as the rotational speed of the recording medium decreases from the second speed to the first, nominal speed at the expiration of the second predetermined time period. increasing the speed of the motor from a nominal speed used for reading and writing to a higher speed after the hard disk driver is powered off is further employed. When the motor speed increases, the air flow causes the support arm to lift away from the recording surface from the read/write height to the safe height. The actuator lifts the support arm from the safe height to the parking height.

BRIEF DESCRIPTION OF THE DRAWINGS

The present invention will be understood from the detailed description given hereinbelow and from the accompanying drawings of the preferred embodiment which are given for explanation and understanding only and are not intended to imply limitation of the invention.

In the drawings:

FIG. 1 is a circuit block diagram of the hard disk driver apparatus;

FIG. 2 is a time chart showing a relationship among the power supply, the rotation number of the disk, and the loading and unloading positions of a flying head slider; and FIG. 3 is a diagram showing a relationship between the floating amount of the slider and the rotation speed of the disk.

DESCRIPTION OF THE PREFERRED EMBODIMENT

The preferred embodiment of a hard disk driver apparatus according to the present invention will be described hereinbelow with reference to the accompanying drawings.

Figure 1:
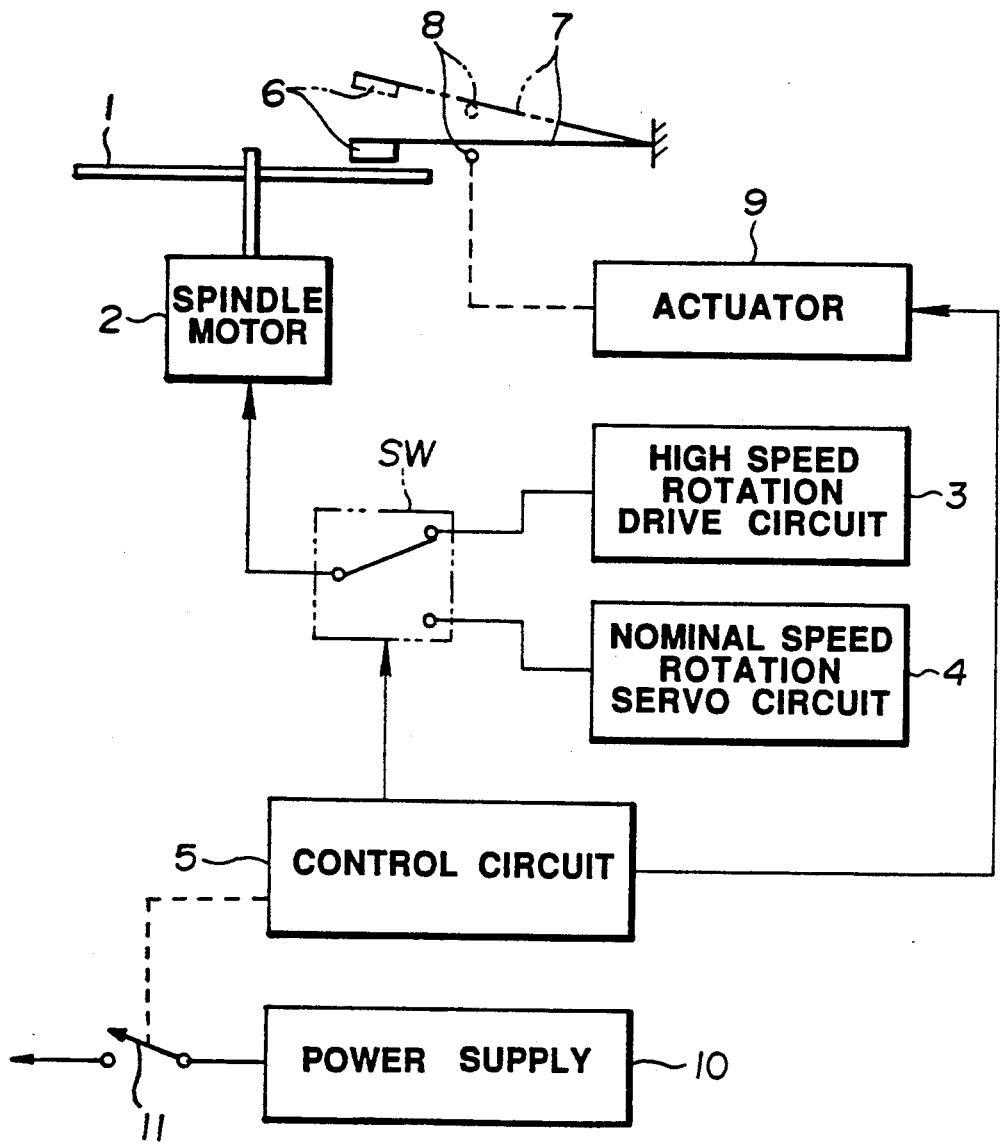
FIGS. 1 to 3 show one embodiment of a hard disk driver apparatus according to the present invention.

Referring to FIG. 1, a disk 1 is supported on a turntable (not shown in the drawings) which is rotated by a spindle motor 2. The spindle motor 2 is operated depending upon a drive signal output which is delivered from either a high speed rotation drive circuit 3 or a nominal speed rotation servo circuit 4. The high speed rotation drive circuit 3 outputs a drive signal so as to rotate the spindle motor 2 at a velocity higher than a nominal velocity, for instance more than 5,000 rpm. The nominal speed rotation servo circuit 4 outputs a drive signal so as to rotate the spindle motor 2 at the nominal velocity, for instance 3,600 rpm, at which data is recorded on the disk or data recorded thereon is reproduced. Each of the high speed rotation drive circuit 3 and the nominal speed rotation servo circuit 4 is electrically connected to the spindle motor 2 through a switch SW. The switch SW is changed between the high speed rotation drive circuit 3 and the nominal speed rotation servo circuit 4 depending upon a signal output delivered from a control circuit 5.

A flying head slider 6 is provided with a pair of side rails, on its surface facing the disk 1. A magnetic head is disposed at one of the rails. The flying head slider 6 is mounted on a distal end of a support arm 7, the other end of which is fixedly supported on the body of the hard disk driver apparatus. The support arm 7 is movable relative to the surface of the disk such that the flying head slider 6 contacts the surface of the disk 1 when no air flow, due to rotation of the disk 1, is present. A retaining pin 8 is disposed below the support arm 7 and actuated by an actuator 9 to move between a first position, shown in FIG. 1 by a solid line and a second position shown by a dot and dash line. In the first position, the retaining pin 8 is positioned beneath and not in contact with the support arm 7. In the first position, the retaining pin 8 is positioned beneath and apart from the support arm 7. In the second position, the pin 8 presses the support arm 7 upwards so that the support arm 7 is elastically deformed to be apart from the surface of the disk 1. Accordingly, the slider 6 mounted on the support arm 7 is moved between the first and second positions which are respectively the loading and unloading positions of the slider 6.

When the disk 1 starts to rotate, air flow is generated in the vicinity of the surface of the disk 1. This air flow produces a positive pressure between the disk surface and the surface of the slider 6, resulting in separation of the slider 6 from the surface of the disk 1. The actuator 9 is electrically connected to the control circuit 5. The actuator 9 is controlled by the circuit 5 so as to move the pin 8 between the first and second positions. When a power switch 11, which controls the supply of power from a power supply 10 to the hard disk driver, is turned on or off, the control circuit 5 receives data input and controls the switch SW based upon the data input. As a result, the spindle motor 2 is connected through the switch SW to either the high speed rotation drive circuit 3 or the nominal speed rotation servo circuit 4.

Figure 2:
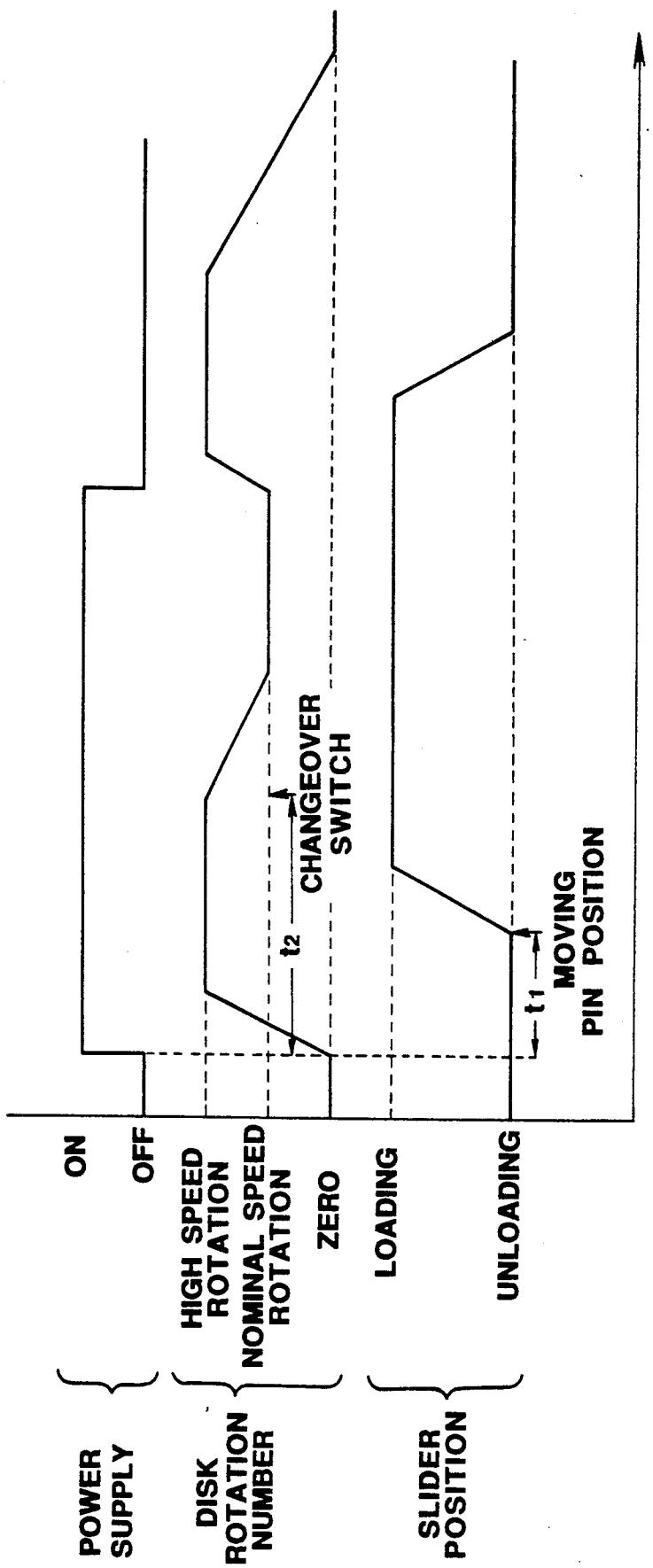

In the aforementioned constitution, when the power switch 11 is in the OFF position, the pin 8 is in the second position and thereby the slider 6 is in the unloading position. When the power switch 11 is turned on, the switch SW is connected to the high speed rotation drive circuit 3 so that the disk 1 is rotated at a velocity higher than the nominal velocity. After a predetermined period $t_1$ has lapsed, the pin 8 is operated by the actuator 9 to move from the second position to the first position shown in FIG. 1. The slider 6 moves relative to the disk surface and is close thereto due to the change in the position of the pin 8. Air flow generated by the rotation of the disk 1 flows between the slider surface and the disk surface, which are opposed to each other. When the elastic force of the support arm 7 and the positive pressure caused by the air flow are balanced, the slider 6 stops its advancing movement relative to the disk surface and floats over the disk surface. Thus, as shown in FIG. 2, the position of the slider 6 is changed from the unloading position to the loading position.

Figure 3:
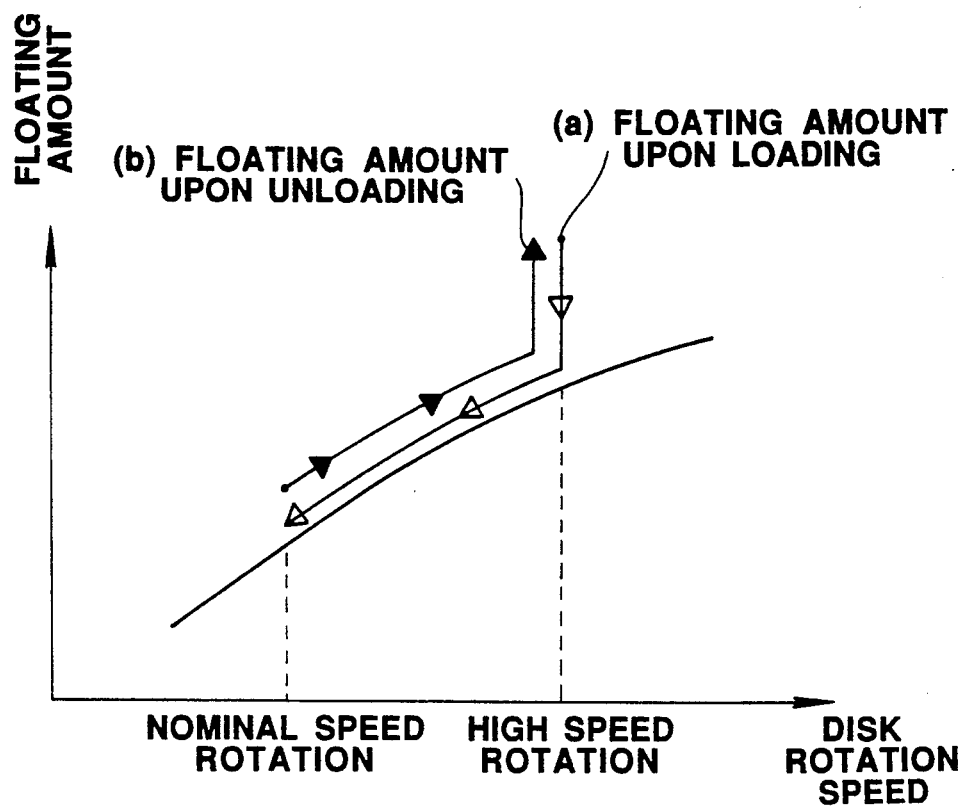

Referring to FIG. 3, the floating amount of the slider 6 due to the positive pressure of the air flow applied thereon increases as the rotation speed of the disk 1 increases. Upon high speed rotation of the disk 1, since the floating amount of the slider 6 is greater than that during nominal speed rotation of the disk 1, the slider 6 is balanced at a position spaced at a greater distance from the disk 1 as compared with a read/write height, hereinafter referred to as the normal recording or reproducing position. Accordingly, when the slider 6 moves to the loading position, the slider 6 is prevented from contacting with the recording surface of the disk 1 due to vibration of the support arm 7. Further, when a predetermined time period $t_2$ has lapsed, the switch SW is switched to the nominal speed rotation servo circuit 4, and the rotation speed of the disk 1 gradually decreases to the nominal speed thereof so that the floating amount of the slider 6 decreases as shown in line (a) of FIG. 3. The slider 6 is moved close to the disk surface and stopped in the gradual loading position. This loading movement of the slider 6 relative to the disk surface is caused due to gradual reduction of the positive pressure generated beneath the slider 6. Therefore, the slider 6 mounted on the support arm 7 is free from vibration. Therefore, no contact of the slider with the disk surface 1 occurs.

When the power switch 11 is turned off after recording or reproduction of data, the switch SW is connected to the high speed rotation drive circuit 3. The rotation speed of the disk 1 increases so that the floating amount of the slider 6 increases as shown in line (b) of FIG. 3. Subsequently, the retaining pin 8 supporting the support arm 7 is moved by the actuator 9 from the first position to the second position. To this end, the slider 6 mounted on the support arm 7 is increasingly moved apart from the disk surface and reaches the unloading position. Accordingly, after the lapse of a predetermined period following the power switch off-operation, the slider 6 is moved from the loading position to the unloading position. Thus, during both operations in which the slider's position is changed from unloading to loading and vice versa, the slider 6 is effectively exempt from contact with the disk 1.

As is obvious from the aforementioned description of the preferred embodiment of the invention, the disk is rotated at a higher speed than a nominal speed for data record/reproduction when the flying head slider is moved between the loading and unloading positions. Even when the floating amount of the slider is reduced, the slider is moved away from the disk surface so as to prevent undesirable contact with the disk surface upon moving between the unloading and loading positions. Accordingly, both the slider surface and the disk surface are effectively safe from damage due to contact therebetween.

What is claimed is:

1. A hard disk drive apparatus comprising:
   (a) a power supply, including a power switch which can be turned on an off, for selectively supplying power;
   (b) motor means, including a speed controllable motor, for rotating a recording medium either at a first, nominal speed of a second speed higher than the nominal speed;
   (c) a flying head slider for supporting a transducer head relative to a recording surface on the recording medium as a result o an air bearing effect created by an air flow generated by rotation of the recording medium;
   (d) support means which can be controlled to support the flying head slider at an unloading position where the flying head slider is prevented from contacting the recording surface; and
   (e) control means connected to the power switch, the motor means, and the support means for detecting that the power switch has been turned off and thereafter controlling the motor to increase the rotational speed of the recording medium from the first, nominal speed to the second, higher speed thereby increasing the air flow and causing the flying head slider to lift the transducer head further away from the recording surface, and for thereafter controlling the support means to support the flying head slider from the unloading position.

2. A hard disk drive apparatus according to claim 1, wherein the control means further controls the motor to rotate the recording medium at the second ,higher speed after detecting that the power switch has been turned on, controls the support means to cease supporting the flying head slider from the unloading position at the expiration of a first predetermined time period form when the power switch has been turned on, and controls the motor to rotate the recording medium at the first, nominal speed at the expiration of a second predetermined time period from when the power switch has been turned on, to cause the flying head slider to gradually move from the unloading position to a loading position immediately above the recording surface as the rotational speed of the recording medium decreases form the second speed to the first, nominal speed after the expiration of the second predetermined time period.

3. A method of raising a transducer head of a hard disk drive away from a recording surface of a rotating recording medium when the hard disk drive is depowered, comprising the steps of:
   (a) flying a head slider for supporting the transducer head relative to the recording surface on an air bearing created by rotation of the recording medium at a first, nominal speed;
   (b) turning off a power supply for supplying power to the hard disk drive; and
   (c) thereafter increasing the rotation of the recording medium from the first, nominal speed to a second speed, higher than the nominal speed, thereby increasing a lifting force exerted by air bearing on the flying head slider and causing the flying head slider to lift the transducer head further away form the recording surface, and
   (d) thereafter stably supporting the flying head slider at an unloading position where the flying head slider is prevented from contacting the recording surface after the recording medium stops rotating.

4. A method of raising a transducer head of a hard disk drive according to claim 3, comprising the further steps of turning on the power supply and then rotating the recording medium at the second speed, releasing the flying head slider from the unloading position at the expiration of a first predetermined time period from when the power supply has been turned on, and rotating the recording medium at the first, nominal speed at the expiration of a second predetermined time period from when the power supply has been turned on, to cause the flying head slider to gradually move from the unloading position to a loading position immediately above the recording surface as the rotational speed of the recording medium decreases from the second speed to the first, nominal speed at the expiration of the second predetermined time period.

* * * * *